March 8, 1927.
J. McELWAIN
1,620,606
METHOD OF AND APPARATUS FOR INDICATING THE AMOUNT OF LIQUID IN A SUPPLY TANK
Filed April 21, 1922 — 3 Sheets-Sheet 1
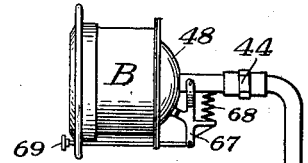
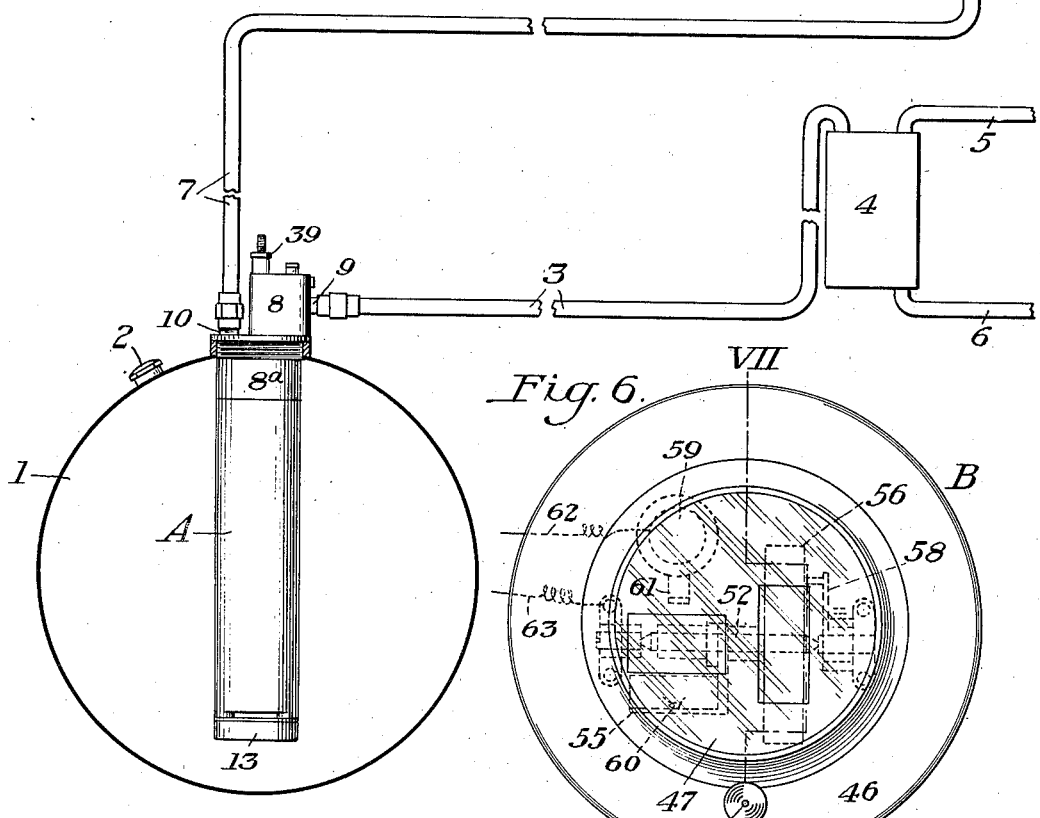
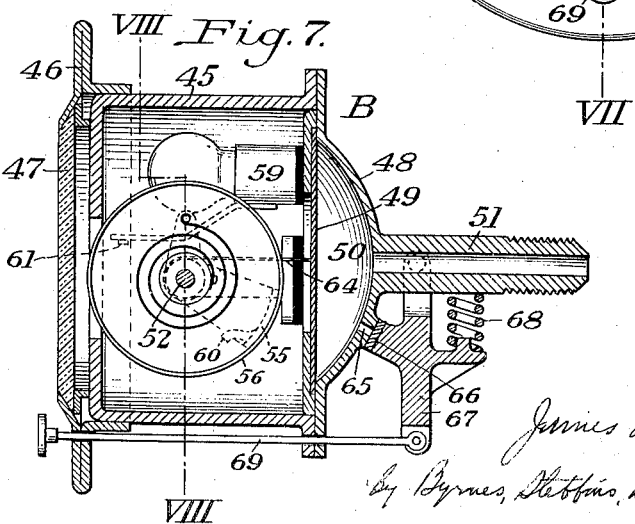
INVENTOR
James McElwain
By Byrnes, Stebbins, Burgess & Parmelee
his Attorneys March 8, 1927. 1,620,606
J. McELWAIN
METHOD OF AND APPARATUS FOR INDICATING THE AMOUNT OF LIQUID IN A SUPPLY TANK
Filed April 21, 1922   3 Sheets-Sheet 2

INVENTOR
James McElwain
by Byrnes, Stebbins, Burges Parmelee
his Attorneys

March 8, 1927.  1,620,606
J. McELWAIN
METHOD OF AND APPARATUS FOR INDICATING THE AMOUNT OF LIQUID IN A SUPPLY TANK
Filed April 21, 1922  3 Sheets-Sheet 2
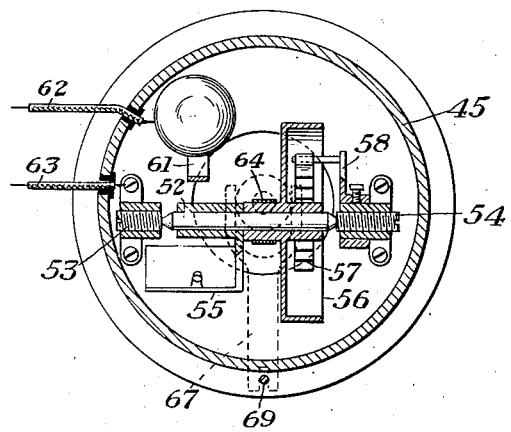
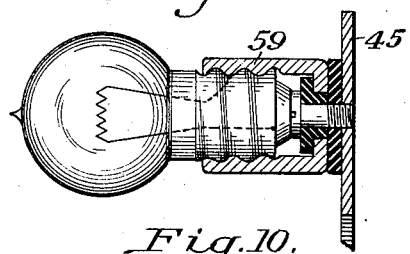
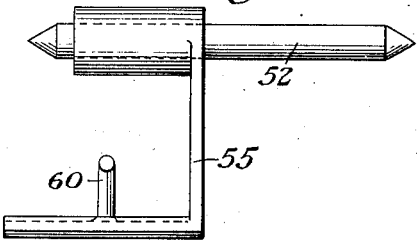
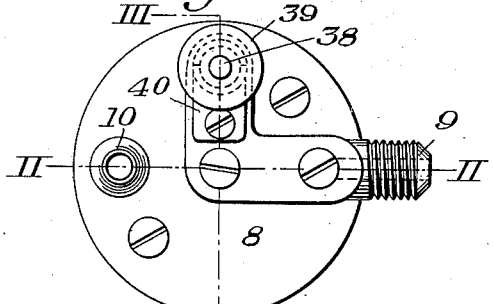
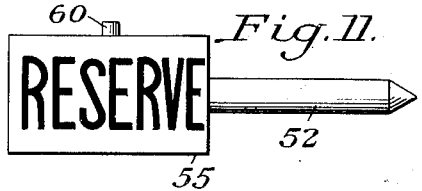
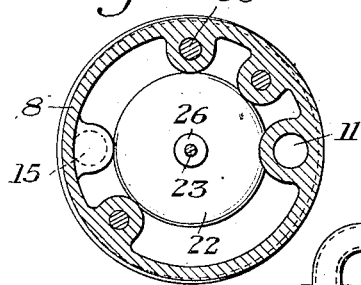
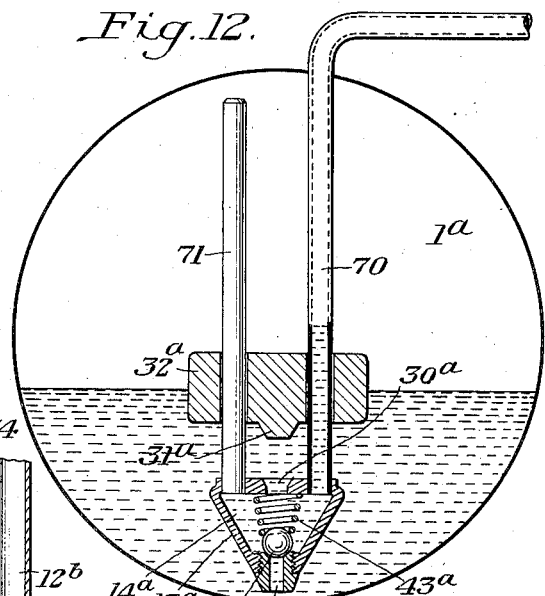
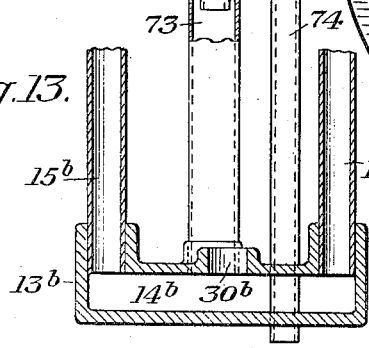

Patented Mar. 8, 1927.

1,620,606

UNITED STATES PATENT OFFICE.

JAMES McELWAIN, OF WHEELING, WEST VIRGINIA, ASSIGNOR OF ONE-HALF TO J. E. WRIGHT, SR., OF WHEELING, WEST VIRGINIA.

METHOD OF AND APPARATUS FOR INDICATING THE AMOUNT OF LIQUID IN A SUPPLY TANK.

Application filed April 21, 1922. Serial No. 555,823.

My invention relates to a method of and apparatus for indicating the amount of liquid in a supply tank and for giving a signal when the level of liquid in the tank has reached a predetermined point which may be termed the reserve level.

By the employment of my invention, means are provided for indicating the level of a liquid in a supply tank and for signalling when the reserve level has been reached. Means are also provided for adjusting the device so that the reserve signal will be given at any desired level of the liquid in a given tank. Means are also provided for checking the system and for automatically priming the same. My invention is particularly useful in indicating the gasoline level in supply tanks for automobiles, the indicating means being placed on the dash in full view of the operator. It will be understood, however, that my invention is not limited to use with automobiles as it has a wide field of application.

The invention will be better understood by reading the following description taken in connection with the accompanying drawings, in which—

Figure 1 is a schematic drawing showing the relation of the parts when installed;

Figure 4 is a plan view of the device shown in Figures 2 and 3;

Figure 5 is a section on line V—V of Figure 2;

Figure 6 is a front view of the gage;

Figure 7 is a section on line VII—VII of Figure 6;

Figure 8 is a section on line VIII—VIII of Figure 7;

Figure 9 is an enlarged view of the signal lamp with the socket shown in section;

Figure 10 is a view of the reserve signal and its operating shaft;

Figure 11 is an elevation of the device shown in Figure 10;

Figure 12 is an elevation, partly in section, of a modified form of the invention; and Figure 13 is an elevation, partly in section, of a still further modified form of the invention.

Figure 2:
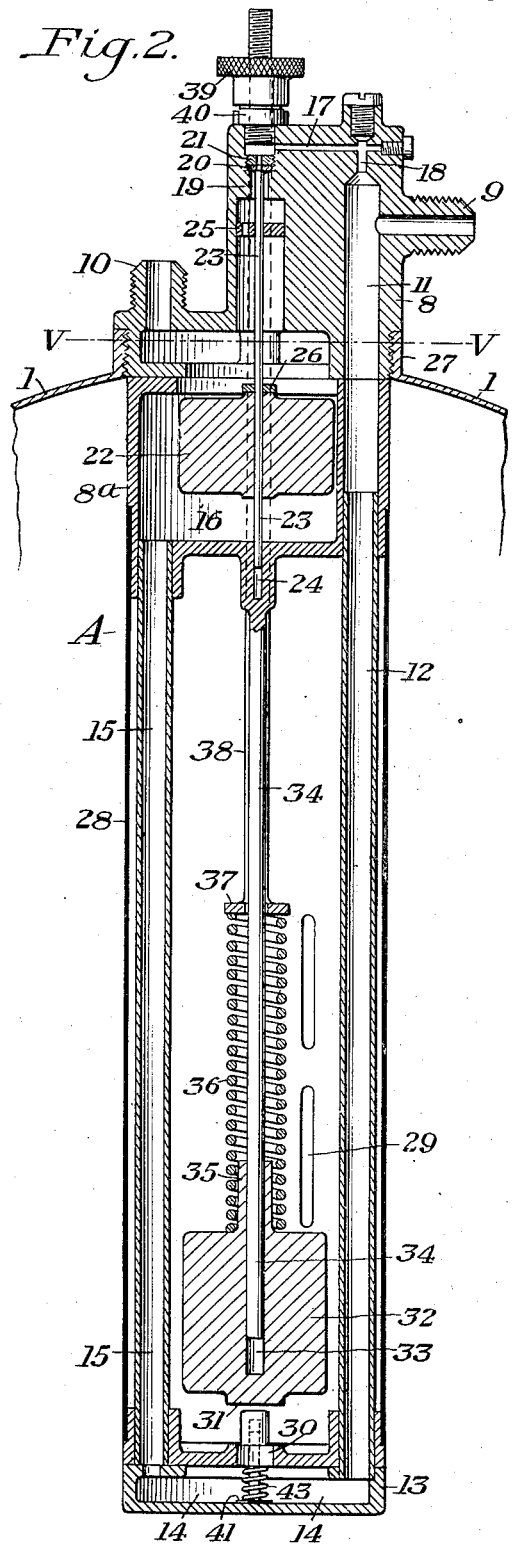
Figure 2 is a vertical section of that part which is placed in the supply tank, taken on line II—II of Figure 4.

Referring to the drawings, Figure 1, the supply tank 1 of an automobile, having the usual filling cap 2, is provided with a device A inserted therein through an opening in the tank wall, as will be described later. A pipe 3 is connected with the device A and leads to the usual vacuum tank 4 used in automobiles. The pipe 5 connects with the engine manifold and the pipe 6 with the carburetor. The function of this apparatus is well understood and need not be described in detail.

A gage pipe 7 is connected at one end with the device A and at the other end with a gage B, which may be placed on the dash of an automobile or at any other desired place so as to be readily observed by the operator.

Figure 3:
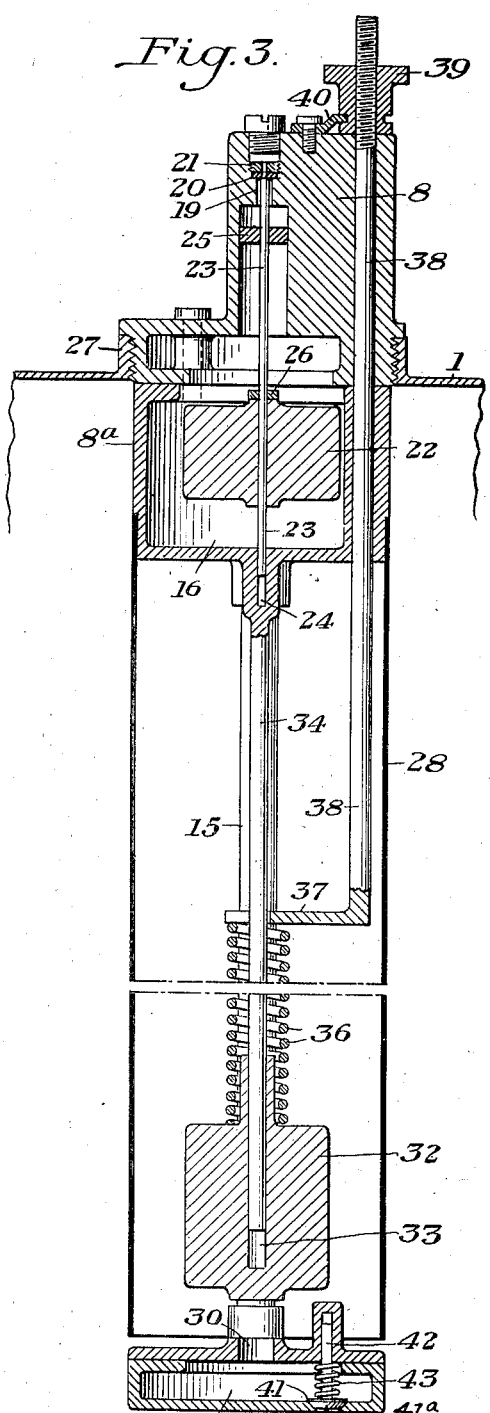
Figure 3 is a vertical section of the device shown in Figure 2, taken on line III—III of Figure 4.

The device A is shown in detail in Figures 2 and 3, and comprises a casting 8 having a chambered casting 8$^a$ secured thereto by any suitable means, and provided with nipples 9 and 10 for making suitable connection to the pipes 3 and 7 respectively. A passage 11 communicates with the opening in the nipple 9 and leads downwardly to a pipe 12 which connects at its lower end with a casting 13 which is provided with a chamber 14. A tube 15 also communicates with the chamber 14 and extends upwardly into communication with the opening in the nipple 10 through a chamber 16 in the casting 8$^a$, as best shown in Figure 2. A passage 17 extends horizontally across the top of the device A and communicates at one end with the passage 11 through the passage 18. The other end of the passage 17 communicates with the chamber 16 through a passage 19. The passage 19 is provided with a valve seat 20 of any suitable material, held in place by a hollow seat retaining screw 21.

A float 22 made of cork or other suitable material is located in the chamber 16 and carries a valve rod. One end of the rod extends into a guide socket 24 in a part of the casting 8$^a$, while the other end is adapted to close the upper portion of the opening through the valve seat 19. The valve rod 23 is provided with a perforated guide 25 which is fastened to the rod and moves therewith and is further provided with a collar 26 which is securely fastened thereto and through which the float 22 acts to positively raise the valve rod 23.

The tank 1 is provided with an upstanding boss 27 into which the entire device A may be bodily inserted and screwed into place. The device as a whole is in cylindrical form, it having a casing 28 extending between the castings 8$^a$ and 13 and provided with liquid inlet opening 29.

The chamber 14 is provided with an opening 30 with which a valve portion 31 of a float 32 cooperates. The float 32 is provided with a socket 33 into which a guide rod 34 extends and is also provided with a neck portion 35 around which is placed one end of a coiled spring 36. The other end of the spring 36 bears against a fork 37 on an adjusting rod 38, the fork straddling the rod 34 as shown in Figures 2 and 3. The rod 38 extends up through openings in the castings 8$^a$ and 8 and is provided at its upper end with an adjusting nut 39. This nut has an annular groove in which a retaining device 40 is placed so that by turning the nut the rod 38 may be positively moved up or down so as to adjust the compression of the spring 36, for a purpose which will appear later.

The chamber 14 is further provided with an opening 41' which is normally closed by a valve 41. This valve has a guide rod 42 around which is placed a coiled spring 43. One end of the spring 43 bears against the valve 41 and the other end against the interior wall of the chamber 14, thus acting to normally hold the valve 41 closed.

The gage B is connected to the pipe 7 by any suitable pipe connection 44. The gage is shown in detail in Figures 7 and 8. It comprises a casing 45 on the front of which is fastened a flange 46 carrying a glass 47. The back of the casing 45 is provided with a cover 48. A diaphragm 49 is fastened between the casing 45 and the cover 48 so as to provide a chamber 50 which communicates with the pipe 7 through a nipple 51 on the cover 48.

A shaft 52 is mounted in the casing 45, the ends of the shaft being tapered and supported by adjustable screws 53 and 54, which are suitably supported by the casing. The shaft 52 carries a signal member 55 upon which the word "Reserve" or a word of similar import is written, as shown in Figures 10 and 11. The shaft 52 also carries an open-ended drum 56. A coiled spring 57 is wound about the shaft 52, one end thereof being fastened to the shaft through the hub portion of the drum 56, the other end of the spring 57 being connected to a bracket 58 mounted on the casing 45.

A lamp socket 59 is mounted upon the casing 45 and is insulated therefrom, as shown in Figure 9. The signal member 55 carries a contact 60, and a cooperating contact 61 is mounted on the lamp socket 59, as shown in Figure 7. A wire 62 connects with the lamp socket 59, and a wire 63 connects with one of the bearings for the shaft 52, which bearings are insulated from the frame, as shown in Figure 7. A flexible ribbon 64 is connected at one end with the diaphragm 49, the other end being wrapped around and secured to the shaft 52. The diaphragm 49 is usually of nonconducting material, but if a metallic diaphragm should be used, the ribbon 64 either should be of non-conducting material or should be insulated from the diaphragm or from the shaft 52, so that the contacts 60 and 61 may be used to control the circuit through a lamp placed in the socket 59, as will be explained later.

The chamber 50 is provided with an outlet 65 which is normally closed by a valve 66 carried by a pivoted member 67. The parts are held in the position shown in Figure 7 by a compression spring 68. A rod 69 leads to the front of the gage and may be used to open the valve 66 to check up the system, as will be explained later.

Figure 12 shows a modification of the device A. In the device shown in this figure, a pipe 70 extends down into the tank 1$^a$ and communicates with a chamber 14$^a$ in a casting 13$^a$. This casting is provided with an opening 30$^a$ having a valve seat thereon, and a float 32$^a$ has a valve 31$^a$ thereon which cooperates with the seat in the opening 30$^a$. The float 32$^a$ is provided with openings through one of which the pipe 70 extends and through the other of which a guide rod 71 extends. The rod 71 is supported by the pipe 70 through the casting 13$^a$. An opening 72 is provided in the lower end of the casting 13$^a$ and communicates with the chamber 14$^a$. A ball valve 41$^a$ cooperates with a valve seat in the passage 72 and is normally held closed by a coiled spring 43$^a$. The operation of this device will be explained later.

The modification shown in Figure 13 comprises a casting 13$^b$ into which lead the lower ends of tubes 12$^b$ and 15$^b$. These tubes communicate with each other through the chamber 14$^b$ in the casting 13$^b$. The casting is provided with an opening 30$^b$ with which cooperates a valve on a float (not shown), similar to the floats 32 and 32$^a$. A tube 73 is fastened at one end in the casting 13$^b$ and communicates with the chamber 14$^b$. A tube 74 connects at one end with the upper end of the tube 73, and the other end extends downwardly below the bottom of the casting 13$^b$. The operation of this device will be described later.

The operation of the apparatus shown in Figures 1 to 11, inclusive, is as follows:

The tank is filled to the desired level, and since the tubes 12 and 15 communicate with each other through the chamber 14 and with the tank 1 through the opening 30, the gasoline will stand at the same level in the tubes 12 and 15. When the engine has started, suction is created through the pipe 3 and is communicated to the pipe 12 through the passage 11. At that time the float 22 is down and the valve 20—23 is open. The suction is therefore communicated to the chamber 16 through the passages 18 and 17. The suction carries gasoline up through the pipe 12 into the pipe 3 to the vacuum tank 4. At the same time gasoline is drawn into the chamber 16 sufficiently to fill the same until the float is raised to close the valve 20—23. When this happens, the chamber 16 is cut off from the suction line 3. The pipe 7 which leads to the chamber 50 on the gage freely communicates with the chamber 16, so that the same degree of vacuum is in the chamber 50 as in the chamber 16. This will cause a deflection of the diaphragm and, through the ribbon 64, the shaft 52 will be rotated so that the indicia which may be placed on the drum 56 will be visible through the glass 47 at the front of the gage. The level of gasoline in the chamber 16 will be automatically maintained constant by reason of the float controlled valve. The amount of vacuum in the chamber 16 required to maintain the gasoline level, will vary proportionately with the difference between that level and the level of gasoline in the tank 1, so that the amount of vacuum in the chamber 50 will at all times be proportional to the difference between the fixed level of gasoline in the chamber 16 and the varying level of gasoline in the tank. By suitably calibrating the gage mechanism, it will be apparent that the indicia on the drum 56 will at all times indicate to the operator the amount of gasoline in the tank 1. When the motor is stopped, the valve 20—23 will be held tightly closed by the float 22 so as to maintain the vacuum in the chamber 50, which in turn will hold the drum in the proper position to indicate the amount of gasoline in the tank.

When sufficient gasoline has been removed from the tank to allow the float 32 to close the opening 30, the supply of gasoline for the tube 12 must be secured through the opening 41$^a$ controlled by the spring pressed valve 41, which is always at a lower level than the opening 30 in the casting 13. It will therefore require a substantial increase in vacuum to overcome the action of the spring 43. With this increase in vacuum the float 22 will be lowered until an increased vacuum has been communicated to the chamber 16 and thence to the chamber 50, after which the float 22 again closes the valve 20. By reason of this increased vacuum the shaft 52 will be rotated sufficiently to bring the word "Reserve" in front of the operator and to close the contacts 60 and 61 which will light the lamp in the socket 59. This will, therefore, give a visual signal to the operator that the gasoline in the tank has reached the reserve level. If the motor is continued in operation until the gasoline level reaches that of the valve 41, air will pass into the vacuum system and up the tube 15, permitting gasoline to flow down through the tube 15. With the vacuum relieved by the air in the chamber, the diaphragm 49 will move back to normal position, the lamp will go out, and the operator will know from this indication that there remains only that gasoline which is in the vacuum system.

The casing 28 is provided with openings 29 which serve the purpose of admitting gasoline to the interior thereof so that the chamber 14 is kept filled with gasoline so long as the level is high enough to cause the gasoline to flow through the opening 30. A second function of these openings is that if properly proportioned they tend to maintain an average level in the casing 28 so that the disturbance of the gasoline in the tank due to movement of the car over the road is not seriously felt, and as a result of which the gage indicator is maintained in a steady position.

In the modification shown in Figure 12, the pipe 70 is connected with the gage and also with the vacuum tank so that the vacuum in the chamber 50 of the gage is the same as the vacuum in the line 70. In this arrangement there is normally no indication of the gasoline level in the tank as the level varies. The only indication produced by the modification shown in this figure takes place when the valve 31$^a$ closes the opening 30$^a$. The increased suction required to operate the valve 41$^a$ is indicated on the gage in exactly the same manner as explained in connection with the arrangement shown in Figures 1 to 11, inclusive.

The modification shown in Figure 13 is identical with that shown in Figures 1 to 11, inclusive, the tubes 73 and 74 taking the place of the valve 41 and its cooperating elements. When the float valve closes the opening 30$^b$, the chamber 14$^b$ is supplied through the tubes 73 and 74, and due to the increased head through which the gasoline must be raised, the reserve signal is given and the lamp lighted.

If it is desired to use the device shown with a gravity system, the pipe 3 would be connected directly to the intake manifold, the pipe 12 omitted, the passage 11 being plugged. The casting 13 is also omitted, as well as the float 32 and the parts which cooperate therewith. When so connected, the gage will operate as above described, with the exception that the light will not be operated.

If it is desired at any time to check the system, the rod 69 may be pushed in so as to open the valve 66. This will relieve the vacuum in the chamber 50 and bring the parts to their initial position. When the valve is again closed, if the parts take the position which they occupied prior to opening of the valve 66, it will indicate that the gage is standing at the correct figure.

If it is desired to adjust the apparatus so as to have the reserve level indicated on the gage at a point different from the original adjustment, the nut 39 may be turned, for instance, to the left, so as to place the spring 36 under greater compression. This would cause the float 32 to close the passage 30 with a higher level of gasoline in the tank. By varying the compression of the spring 36, the reserve level of gasoline may be varied within considerable limits.

My invention has many advantages, among which may be mentioned that an accurate indicator is provided to advise the operator of the amount of gasoline in the tank at all times; a special light and visual signal are provided when the gasoline level reaches a predetermined point; a fixed column of the liquid is utilized as a standard in indicating the gasoline level; means are provided for effectively eliminating the variation of liquid level due to road conditions; means are provided for testing the system at any desired time; and the device is automatically primed and is simple in structure and automatic in operation.

While I have shown and described some of the embodiments of my invention, I desire it to be understood that I am not limited to the exact arrangements shown and described, as many changes may be made in the details thereof without departing from the spirit of my invention.

I claim:

1. A liquid gage including a tank, a conduit through which liquid is withdrawn from the tank, valve means effective for increasing the resistance to liquid flow through the conduit, float means responsive to the liquid level in the tank for automatically causing the valve to offer such increased resistance, and means for indicating such increase in resistance, substantially as described.

2. A liquid gage including a tank, a conduit through which liquid is withdrawn from the tank, the conduit having an opening to the tank through which liquid normally passes from the tank to the conduit, the conduit also having a second opening through which liquid may pass from the tank to the conduit, but offering a greater resistance to flow than the first mentioned opening, means for closing the first mentioned opening when the liquid level in the tank falls to a predetermined point, indicating means responsive to the varying resistance to flow substantially as described.

3. A liquid gage including a tank, a conduit through which liquid is withdrawn from the tank, the conduit having an opening to the tank through which liquid normally passes from the tank to the conduit, the conduit also having a second opening through which liquid may pass from the tank to the conduit, but offering a greater resistance to flow than the first mentioned opening, means for closing the first mentioned opening when the liquid level in the tank falls to a predetermined point, adjustable means acting on said closing means, for changing the predetermined level, and indicating means responsive to the varying resistance to flow substantially as described.

4. A liquid gage including a tank, a conduit through which liquid is withdrawn from the tank, the conduit having an opening to the tank through which liquid normally passes from the tank to the conduit, and having a second opening offering a greater resistance to flow than the first mentioned opening, means for closing the first mentioned opening when the liquid level in the tank falls to a predetermined point, said means including a float valve normally held clear of the first mentioned opening by the liquid in the tank, and indicating means responsive to the varying resistance to flow substantially as described.

5. A liquid gage including a tank, a conduit through which liquid is withdrawn from the tank, the conduit having an opening to the tank through which liquid normally passes from the tank to the conduit, and having a second opening offering a greater resistance to flow than the first mentioned opening, means for closing the first mentioned opening when the liquid level in the tank falls to a predetermined point, said means including a float valve normally held clear of the first mentioned opening by the liquid in the tank, means tending to load the float valve and submerge the same more than its otherwise normal amount, and indicating means responsive to the varying resistance to flow substantially as described.

6. A liquid gage including a tank, a conduit through which liquid is withdrawn from the tank, the conduit having an opening to the tank through which liquid normally passes from the tank to the conduit, and having a second opening offering a greater resistance to flow than the first mentioned opening, means for closing the first mentioned opening when the liquid level in the tank falls to a predetermined point, said means including a float valve normally held clear of the first mentioned opening by the liquid in the tank, means tending to load the float valve and submerge the same in more than its normal amount, means for adjusting the loading of the float valve whereby the predetermined point may be adjusted, and indicating means responsive to the varying resistance to flow substantially as described.

7. A liquid gage including a tank, a conduit through which liquid is withdrawn from the tank, the conduit having an opening to the tank through which liquid normally passes from the tank to the conduit, the conduit also having a second opening through which liquid may pass from the tank to the conduit, but offering a greater resistance to flow than the first mentioned opening, means for closing the first mentioned opening when the liquid level in the tank falls to a predetermined point, means forming a chamber communicating with the tank through said openings, a vacuum connection for drawing liquid into the chamber from the tank to a fixed level in the chamber, and means responsive to the degree of vacuum required to raise the liquid to said level for indicating the closing of the first mentioned opening, substantially as described.

8. A liquid gage including a tank, a conduit through which liquid is withdrawn from the tank, means for increasing the resistance to liquid flow through the conduit when the liquid level in the tank falls to a predetermined point, means forming a chamber communicating with the tank through said conduit, a vacuum connection for drawing liquid into the chamber from the tank to a fixed level in the chamber, and means responsive to the degree of vacuum required to raise the liquid to said level for indicating the increase in resistance to liquid flow, substantially as described.

In testimony whereof I have hereunto set my hand.

JAMES McELWAIN.